United States Patent [19]
Marogna et al.

[11] Patent Number: 5,645,230
[45] Date of Patent: Jul. 8, 1997

[54] DEVICE FOR CONTROLLING THE GRINDING OF COFFEE, A GRINDING AND DOSING MACHINE PROVIDED WITH THIS DEVICE AND A PROCESS FOR CONTROLLING THE GRINDING OF COFFEE

[76] Inventors: Enrico Marogna; Enrico Mura, both of Viale S. Avendrace, 30, I-09100 Cagliari, Italy

[21] Appl. No.: 609,979

[22] Filed: Feb. 29, 1996

[30] Foreign Application Priority Data

Mar. 31, 1995 [IT] Italy ................... T095A0246

[51] Int. Cl.$^6$ ................... B02C 7/14
[52] U.S. Cl. ................... 241/27; 241/37; 241/100; 241/259.1
[58] Field of Search ................... 241/27, 30, 37, 241/100, 259.1

[56] References Cited

U.S. PATENT DOCUMENTS

| | | | |
|---|---|---|---|
| 4,053,652 | 10/1977 | Mahlmann | 241/2 X |
| 4,895,308 | 1/1990 | Tanaka | 241/65 |
| 5,238,193 | 8/1993 | Pearce | 241/19 |
| 5,269,469 | 12/1993 | Graenicher et al. | 241/6 |
| 5,407,138 | 4/1995 | Graenicher et al. | 241/6 |
| 5,564,634 | 10/1996 | Rouse et al. | 241/37 |

*Primary Examiner*—John M. Husar
*Attorney, Agent, or Firm*—Roylance, Abrams, Berdo & Goodman, L.L.P.

[57] ABSTRACT

A device for controlling the grinding of coffee comprises a pair of facing grinding plates the distance between which is adjustable in such a way as to be able to vary the dimensions of the grains of coffee obtainable upon grinding. The distance between the grinding plates is adjustable in dependence on the value of the humidity detected by an ambient humidity sensor.

19 Claims, 7 Drawing Sheets

DEVICE FOR CONTROLLING THE GRINDING OF COFFEE, A GRINDING AND DOSING MACHINE PROVIDED WITH THIS DEVICE AND A PROCESS FOR CONTROLLING THE GRINDING OF COFFEE

The present invention relates to a device for controlling the grinding of coffee, comprising a pair of facing grinding plates, the distance between which is adjustable in such a way as to be able to vary the dimensions of the coffee grains obtained upon grinding.

The grinding of coffee is generally performed by means of grinding and metering machines or "doser-grinders" which allow the dimensions of the coffee grains obtained by the grinding operation to be selected. The flavour of the coffee drink delivered by an espresso coffee machine depends on the degree of grinding of the coffee. A "good flavour" of the coffee drink corresponds to a correct degree of grinding, which can also be verified visually in that this case the drink has a surface layer of "cream" or foam. If the grinding is not optimum the flavour of the coffee is not so good and this is also verifiable by the almost total absence of "cream" on the surface of the coffee drink.

Known doser-grinder machines have a manually adjustable device for controlling the grinding. One grinding plate is fitted on a shaft of an electric motor and the other grinding plate is connected to a rotatable ring nut which can be manipulated from outside the machine and is connected to it by means of a screw coupling. In this way by rotating the nut it is possible finely to adjust the relative distance between the grinding plates thereby consequentially varying the degree of grinding of the coffee, or rather the dimensions of the coffee grains thus obtained.

However, manual adjustment necessary for known doser-grinder machines depends on the sensitivity and experience of the operator and is often of uncertain outcome. In practice it is necessary to utilise a testing process before obtaining a satisfactory adjustment of the degree of grinding of the coffee in that only after the grinding has been done is it possible to establish the correctness or otherwise by checking the appearance and flavour of the coffee beverage thus obtained. This testing procedure must be repeated at least daily and sometimes even several times in the same day and it inevitably involves loss of time and waste.

The present invention seeks to overcome the disadvantages of known doser-grinder machines by making it possible to obtain the optimum degree of grinding in an extremely rapid manner without any dependence on the experience and sensitivity of the operator.

In particular the Applicants have established that a parameter which is a determining factor in the correct execution of the grinding operation, and which has a determining influence on the dimensions of the ground coffee grains, is the ambient humidity. That is to say there is a correlation between the moisture present in the environment and the degree of grinding necessary to obtain a coffee drink with the most pleasing flavour.

The present invention therefore relates to a device of the above-defined type, characterised in that it includes ambient humidity sensor means, and in that the distance between the grinding plates is adjustable as a function of the humidity value detected by the said humidity sensor means.

Experimental tests conducted by the Applicants have moreover made it possible to define, at least qualitatively, a relation which allows the distance between the grinding plates to be directly determined so as to be able to obtain an optimum grinding of the coffee once the ambient humidity is known. This relation can be expressed graphically by means of a curve which expresses values of absolute distance between the grinding plates as a function of the detected relative humidity values of the air.

The invention further has as its object a doser-grinder machine provided with the above-indicated device, and a process for controlling the grinding of coffee by a doser-grinder machine.

Further characteristics and advantages of the present invention will become more clearly evident from the following detailed description with reference to the attached drawings, provided purely by way of nonlimitative example, in which.

Figure 1:
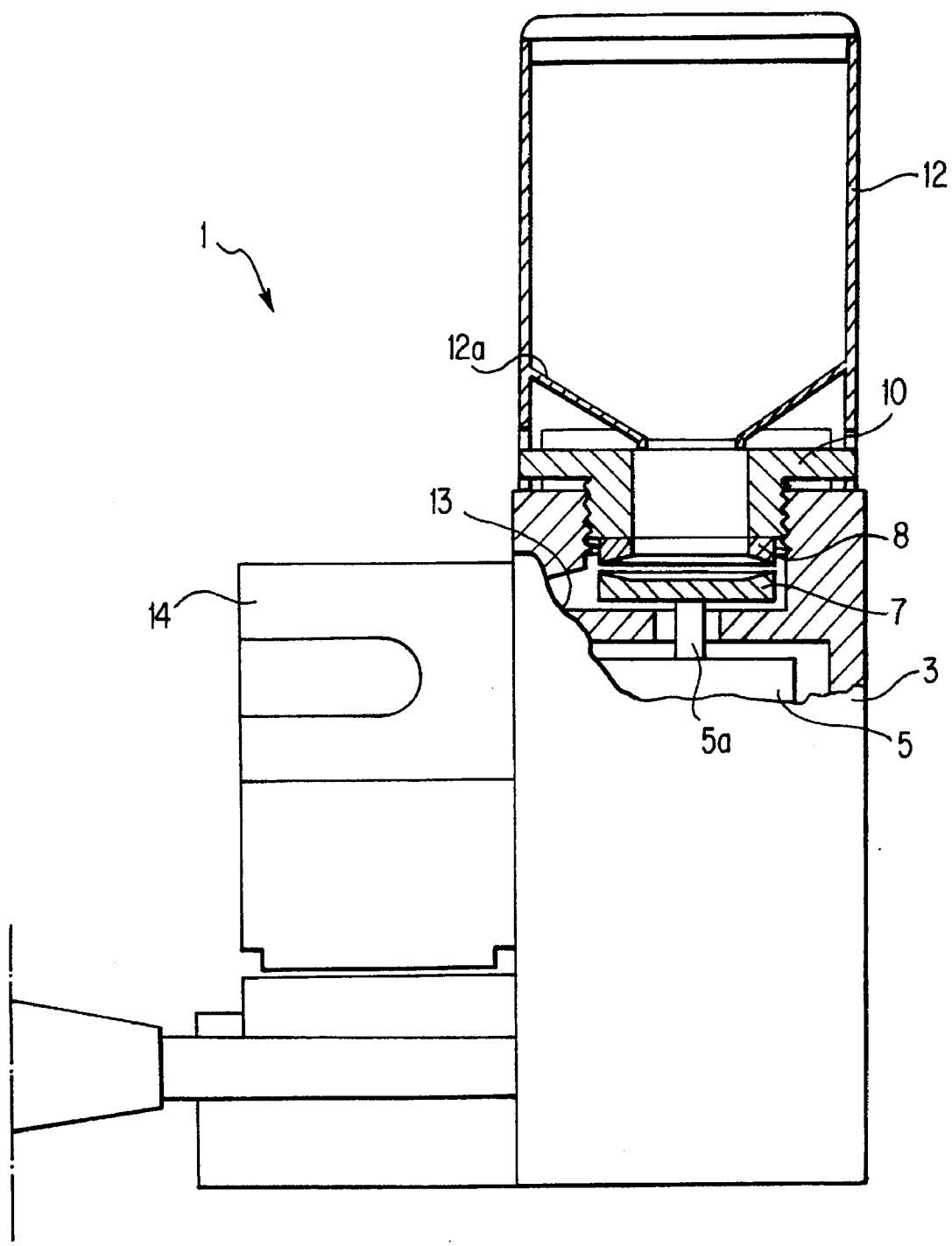
FIG. 1 is a partially sectioned schematic side view of a doser-grinder machine according to the invention.

With reference to the drawings, the reference numeral 1 generally indicates a doser-grinder machine having a body 3. In a manner known per se the body 3 supports an electric motor 5 on the shaft 5a of which is fitted a first grinding plate or wheel 7.

A second, centrally apertured grinding plate 8 is disposed coaxially of and above the grinding wheel 7 in such a way as to face it, and is rigidly connected to an adjustment ring nut 10, also having a central aperture in a manner corresponding to that of the grinding plate 8, associated with the body 3 by means of a screw coupling. In particular the ring nut 10 has a radially outer cylindrical surface provided with axial notches 10a in order to facilitate manual turning of the ring nut 10 about its axis. In practice, by rotating the nut 10 the distance of the grinding plate 8 from the grinding plate 7 is adjusted.

Above the body 3 is disposed a container 12 for coffee beans, the bottom of which is formed as a hopper 12a and which opens into the hole through the ring nut 10 and the grinding plate 8. The coffee ground as a result of the rotation of the grinding plate 7 with respect to the grinding plate 8 flows radially from the grinding plates and is collected in a receptacle 14 through a chute 13. By adjusting the axial distance between the grinding plate 7 and 8 the dimensions of the coffee grains obtained upon grinding is therefore varied. Naturally, it remains understood that what has been described above with reference to the drawings constitutes a possible arrangement, currently preferred, to obtain adjustment of the dimensions of the coffee grains. In particular, the adjustment of the relative position of the grinding plates 7 and 8 can be obtained in a different manner from that described (that is axial movement of the grinding plate 8 controlled by means of the nut 10), for example by making the grinding plate 7 adjustable or by making both the grinding plates 7 and 8 adjustable.

To obtain an optimum dimension of the ground coffee grains so as to make it possible to obtain a drink of coffee with a "good flavour" and with a surface layer of "foam", the dimensions of the ground coffee grains must be adjusted as a consequence of the ambient humidity. In practice the distance between the grinding plates 7 and 8 must be a function of the ambient relative humidity.

Figure 3:
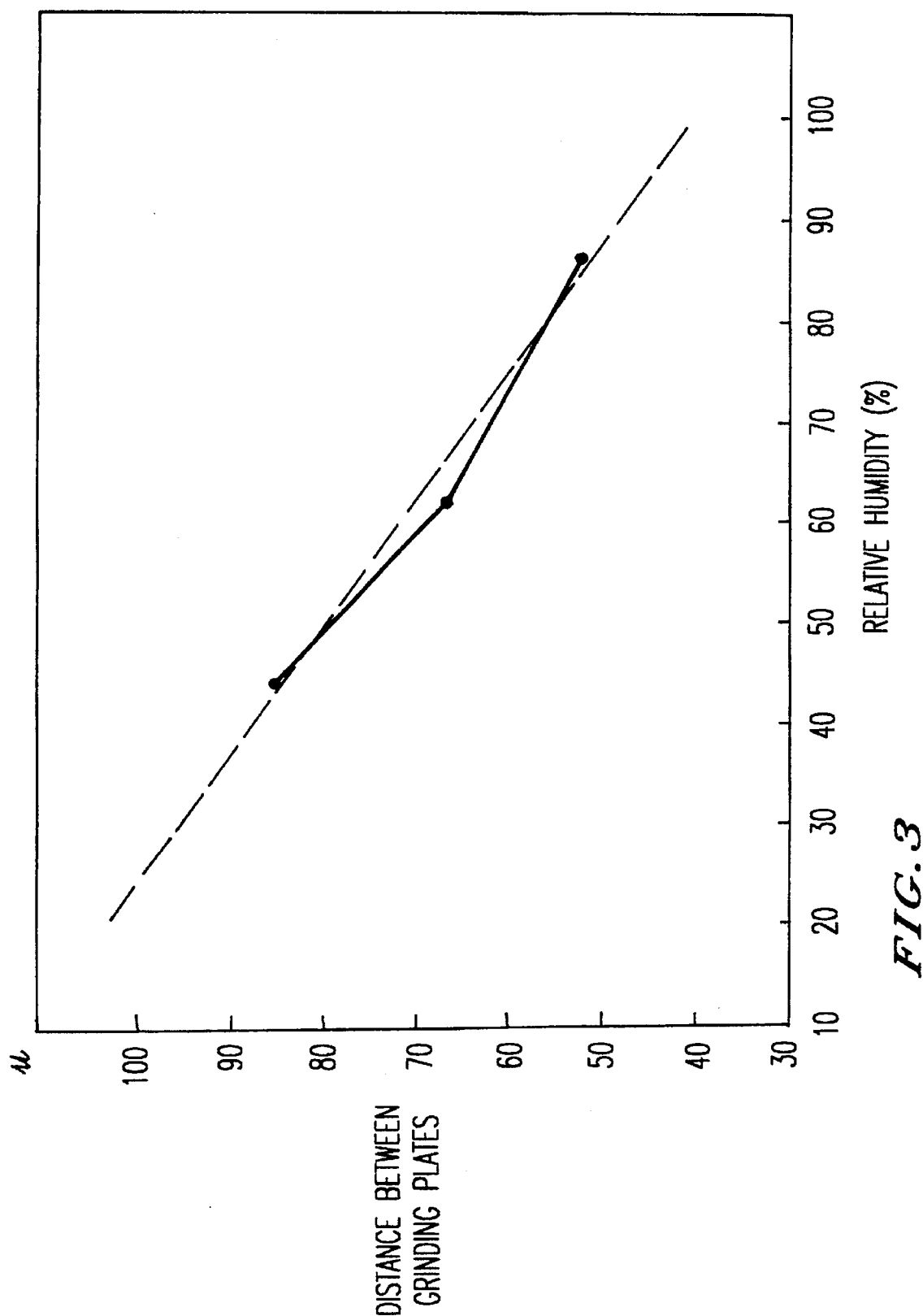
FIG. 3 is a diagram which illustrates qualitatively the optimum distance between the grinding plates of the machine as a function of the ambient relative humidity.

The diagram of FIG. 3 plots the distance D in microns (μ) between the grinding plates 7 and 8, for example with reference to their radially outer edges, as a function of the ambient relative humidity U expressed as a percentage ratio (%). In particular, the solid line of the diagram of FIG. 3 has been obtained from several experimentally determined values for a given mixture of coffee, whilst the broken line represents a straight line interpolation of these values, which graphically expresses, to a first approximation, a functional relationship between the values of the relative humidity U and the corresponding optimum distance D between the grinding plates 7 and 8. This functional relationship can be expressed in terms of mathematical equation in the form:

$$D = AU + B \qquad (I)$$

where: A and B are numerical coefficients dependent for example on the mixture of coffee utilised, D is the distance between the grinding plates 7 and 8 and U is the ambient relative humidity. For the majority of coffees commonly utilised on the market the following numerical values of the coefficients A and B have been determined:

$$A = -0.79$$

and $$B = 119$$

so that the relation I in this case becomes:

$$D = -0.79U + 119 \qquad (II)$$

where D is measured in microns (μ) and U is expressed in percentage values (%).

Associated with the machine 1 is an ambient humidity sensor 16, for example contained in a casing 15 disposed laterally of the body 3. This sensor 16 can provide a variable voltage $V_s$ at its output as a function of the detected ambient humidity.

The ring nut 10, or alternatively the grinding plate 8, is associated with a position transducer 18 operable to detect its instantaneous angular position, which is a function of the distance between the grinding plates 7 and 8. In particular, the transducer 18 may comprise a potentiometer mechanically coupled to the ring nut 10 by means of a toothed wheel 19 meshing with the notches 10a. The transducer 18 provides at its output a voltage $V_p$ which is variable as a consequence of the angular position of the ring nut 10 or the grinding plate 8. An amplifier circuit 24 may conveniently be utilised to amplify the voltage $V_p$ whenever the need arises.

The voltages $V_s$ and $V_p$ are sent to a comparator circuit 25 which can be of analogue or digital type. In particular the signals $V_s$ and $V_p$ are indicative of the quantities which respectively identify the degree of humidity and the distance between the grinding plates 7, 8 (referred to the quantities U and D to which the relations I and II relate).

Figure 2:
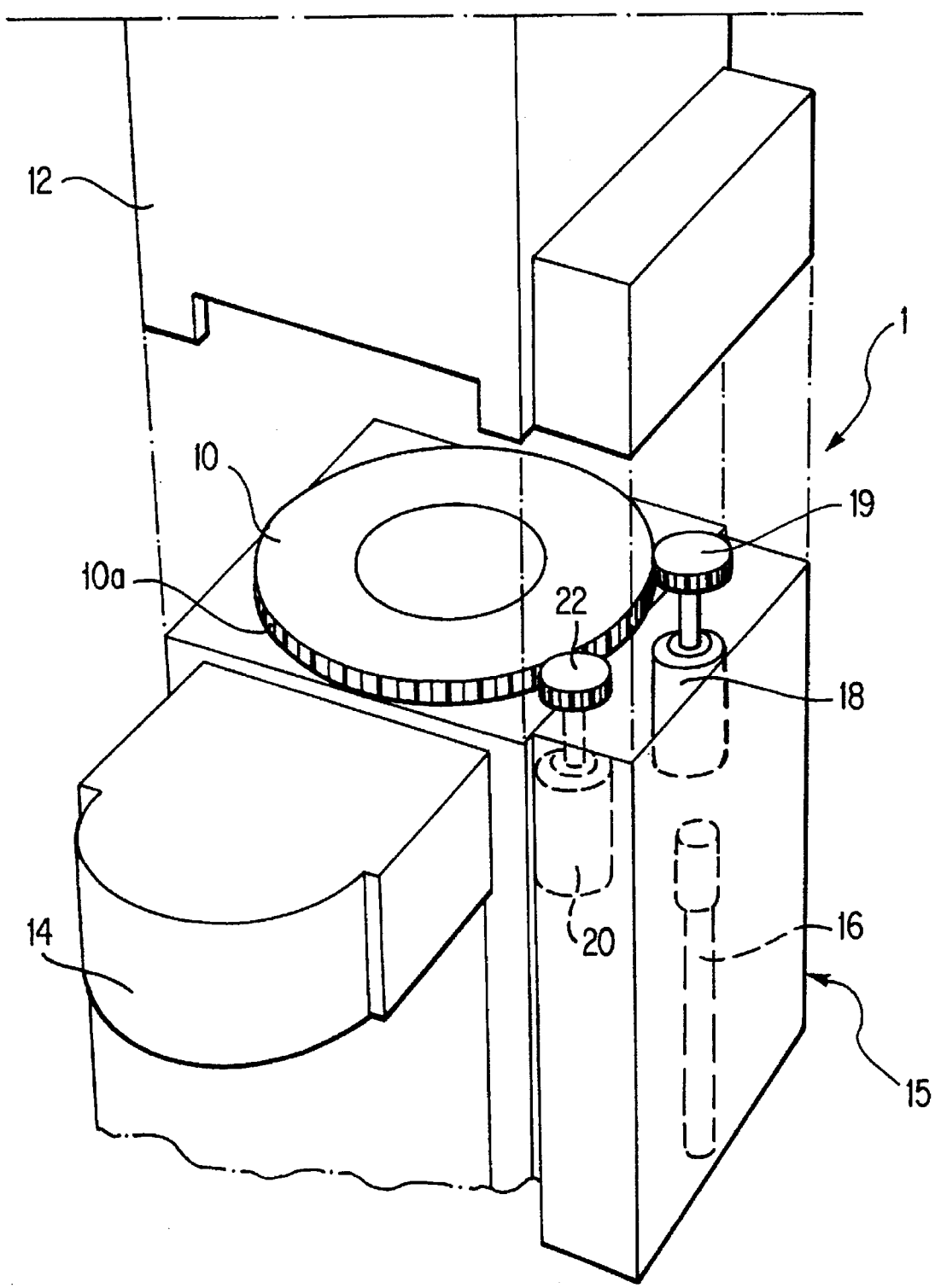
FIG. 2 is a schematic perspective view of a doser-grinder machine provided with a device according to the invention.
Figure 4:
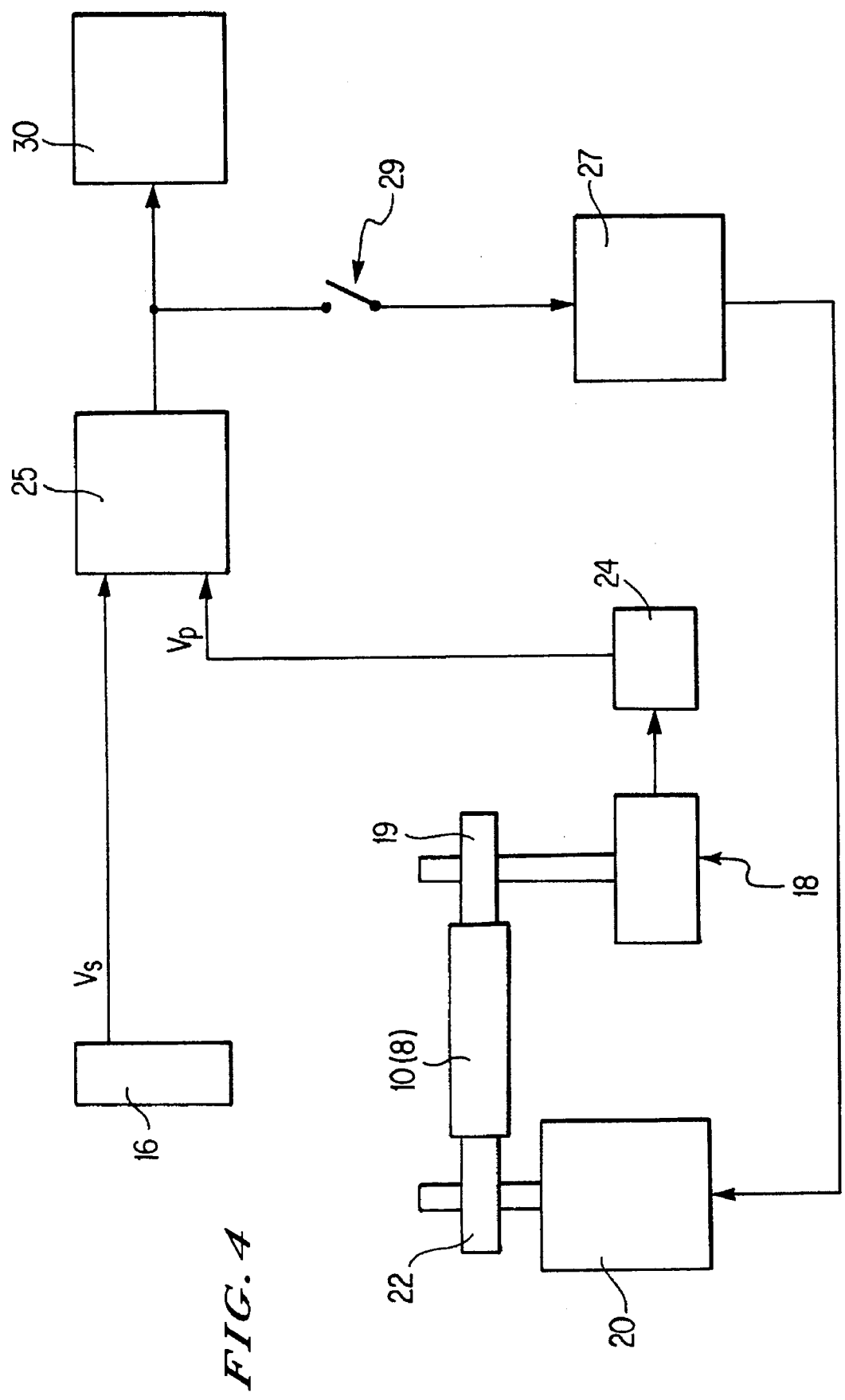
FIG. 4 is a block schematic diagram which illustrates the main components of a device according to the invention.

An indicator device 30 is connected to the comparator circuit 25 and is operable to emit a signal as a consequence of the comparison made by the comparator circuit 25. This signal may for example be an optical signal which may be displayed by means of one or more indicator elements of LED type, indicative of correct adjustment of the distance D between the grinding plates 7 and 8. In this way the operator can utilise the signals generated by the device 30 as a guide for adjusting the distance between the grinding plates 7 and 8 for manually varying the angular position of the ring nut 10 until reaching the optimum adjustment of the distance between the grinding plates 7 and 8 for the humidity detected by the sensor 16. Alternatively, or additionally, the comparator 25 may be connected to a feedback circuit 27 for automatic adjustment of the angular position of the ring nut 10 and/or of the grinding plate 8. This feedback circuit 27 leads to a motor 20 mechanically coupled to the ring nut 10 and the grinding plate 8, for example by means of a toothed wheel 22 meshing with the notches 10a of the ring nut 10 (see FIGS. 2 and 4).

When the automatic adjustment circuit 27 is present the transducer 18 may also be constituted by an ENCODER incorporated in the motor 20.

A switch 29 can be interposed between the circuit 25 and the circuit 27 in such a way as to make it possible to switch this circuit 27 in or out.

The feedback circuit 27 is piloted by the comparator 25 according to criteria known per se, in such a way as to control rotation of the motor 20 in one or other rotational sense according to the result of the comparison performed by the comparator 25, in such a way that the signal $V_p$ (indicative of the distance between the grinding plates 7 and 8) maintains its ratio with the signal $V_s$ (indicative of the degree of humidity), for example in the manner prescribed by relation II.

Figure 5:
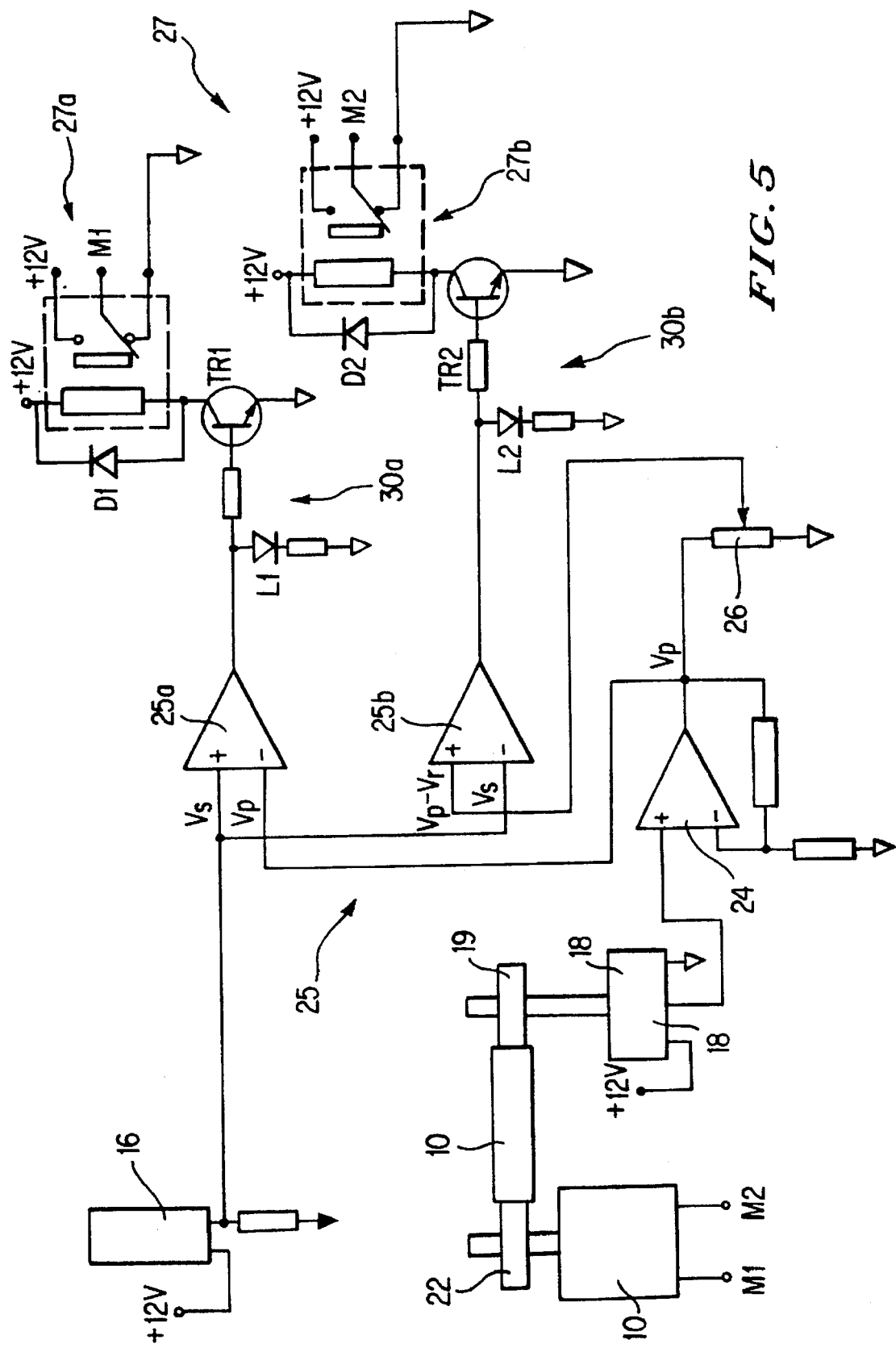
FIGS. 5 and 6 are diagrams of specific embodiments of two control devices according to the invention.
Figure 6:
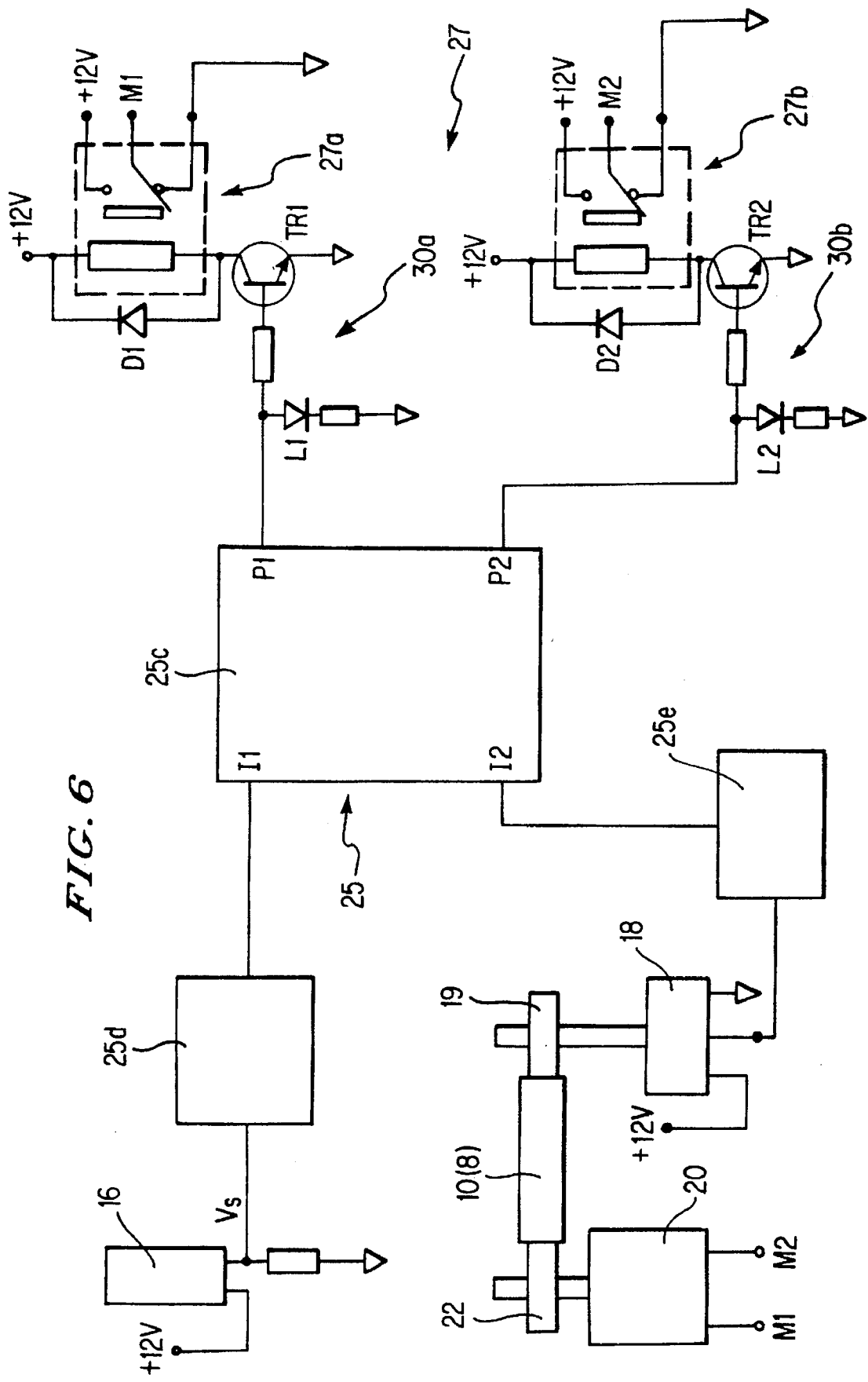

The two detailed diagrams of FIGS. 5 and 6 illustrate how the feedback circuit 27 can be formed in practice in the form of two electronically actuated switches 27a and 27b, each of which can selectively connect one or the other of the terminals M and M2 of the motor 20 to ground or to the supply voltage (usually 12 V DC) so as to cause rotation of the motor 20 in one or the other sense.

Usually, each switch 27a, 27b forms part of a relay or similar actuator (having a switching function) excited by an associated transistor $TR_1$, $TR_2$. These transistors are connected to the circuit 25, for example by their bases, whilst the respective relay is connected in series to the collector-emitter lines.

Advantageously, each transistor $TR_1$, $TR_2$ is associated with a display circuit 30a, 30b, for example comprising a respective LED $L_1$, $L_2$ which illuminates when the associated transistor is in conduction.

The output signal from the comparator 25, which in fact, together with the amplifier 24, implements the relation I or II, can be utilised in at least two different modes. In the specific embodiment illustrated in FIG. 5, which is essentially analogue in nature, the voltages $V_s$ and $V_p$ are supplied to a pair of comparators (operational amplifiers) 25a, 25b which make it possible to verify the correspondence or otherwise between the values of these voltages. In a more specific manner, the comparator 25a directly compares the signals Vs (non-inverting input) and $V_p$ (inverting input). The comparator 25b on the other hand receives signal $V_s$ at its inverting input, and a signal $(V_p - V_r)$ at its non-inverting input, where is a scaled version of $V_p$ tapped by a potentiometer 26 from the output of the amplifier element In practice, the two comparators 25a and 25b implement, according to known criteria, a comparator device with hysteresis the amplitude of which is given by the difference $(V_p - V_r)$.

The embodiment of FIG. 6 illustrates the case in which the circuit 25 is of digital type and is developed in the form of a memory 25c having a first input $I_1$ for connection to the humidity sensor 16 and a second input $I_2$ for connection to the position transducer 18. Respective analogue-to-digital convertors 25d, 25e are interposed between the circuit 25c and the sensor 16, and between the circuit 25c and the transducer 18 for the purpose of transforming the voltages $V_s$ and $V_p$ into digital signals.

Conveniently the processor circuit 25c is arranged to generate at least one signal at its output corresponding to at least one predetermined functional relationship between the signals acquired through the inputs $I_1$ and $I_2$.

Preferably the processor circuit 25c comprises a ROM memory element, for example of EPROM type, in which is stored (in the form of a table) at least one predetermined functional relationship between humidity values U detectable by means of the sensor 16 and the corresponding optimum distances D between the grinding plates 7 and 8. In practice the comparison operation performed by means of the circuit 25 will consist in testing the correspondence or otherwise of the effective distance deduced from the position indication provided by the transducer 18 with the optimum distance memorised in the circuit 25c for a given value of the ambient humidity. This is achieved by providing on the two outputs $P_1$ and $P_2$ respective signals for the switches 27a, 27b.

The functional relationship stored in the memory of the circuit 25c can therefore correspond to the functional relationship mathematically expressible in the form I or II as previously seen.

Naturally, different functional relationships can be envisaged for different qualities of coffee to be ground. In this case a selection circuit will also be present (not illustrated in the drawings) to allow the calibration of the device also to be regulated as a consequence of the quality of the coffee utilised. For example, several relationships of the type I memorised in the memory of circuit 25c can be envisaged, and a selector operable manually from outside the machine 1 positionable in one of a plurality of different positions each corresponding to a different quality of coffee, and connected to the circuit 25c in such a way that the control device of the machine can take into consideration the functional relationship corresponding to the mixture of coffee used.

In the operation of the device the sensor 16 detects the ambient relative humidity U and the transducer 18 detects the angular position of the ring nut 10 and of the grinding plate 8 from which the distance between the grinding plates 7 and 8 is deduced. By comparing the voltage $V_s$ coming from the sensor 16 and the voltage $V_p$ from the transducer 18, or quantities directly correlated to these, it is possible to establish if the distance between the grinding plates 7 and 8 satisfies an optimum adjustment condition predetermined as a function of the detected humidity. If this condition is satisfied the comparator circuit 25 provides an output signal which corresponds to an indication of "optimum adjustment" by the indicator circuit 30. Otherwise the comparator circuit 25 provides an output signal corresponding to an indication of "incorrect adjustment" by the indicator circuit 30.

If the switch 29 is present and it is in the position in which the feedback circuit 27 for automatic adjustment is switched out, the position of the ring nut 10 can be modified manually to obtain an indication of "optimum adjustment" by the indicator circuit 30.

If the switch 29 is in the position in which the feedback circuit 27 is activated this latter will automatically act in an autonomous manner to obtain optimum adjustment of the distance between the grinding plates 7 and 8, upon achievement of which the motor 20 will be stopped.

The apparatus thus adjusted maintains this condition until a predetermined variation of the ambient humidity occurs, in consequence of which the indicator circuit 30 emits a signal indicative of the fact that the adjustment is no longer the optimum one. In this case, if the switch 29 is in the position corresponding to activation of the circuit 27, the optimum distance of the grinding plates 7 and 8 will be obtained in an automatic manner as a consequence of the new humidity value.

Figure 7:
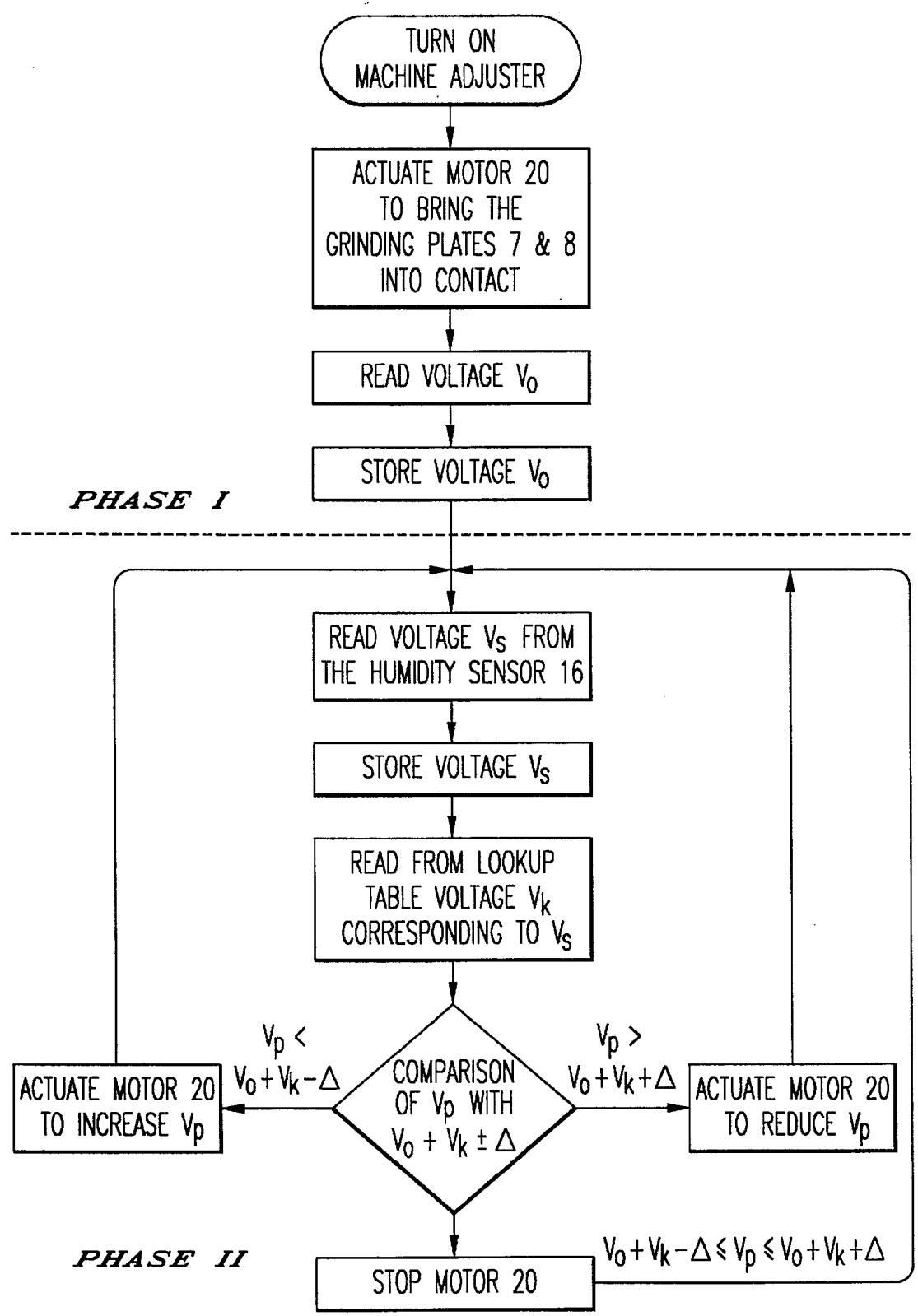
FIG. 7 is a flow diagram which schematically illustrates an algorithm which makes it possible also to take into account wear of the grinding plates during adjustment of their relative separation.

Moreover, the machine 1 can conveniently take account of the wear of the machine 7 and 8 for the purpose of making the adjustment of the relative distance more precise. In this case the device according to the invention can perform a series of operations the algorithm for which is schematically shown as a flow diagram in FIG. 7.

In particular, upon starting up the machine 1 a first phase is performed in which the motor 20 is controlled in such a way as to bring the grinding plates 7 and 8 into contact so as to identify a reference or "zero" position to which corresponds a voltage $V_p = V_O$ delivered by the transducer 18. This reference position is naturally a function of the state of wear of the grinding plates 7 and 8. The voltage $V_0$ is therefore memorised in a variable before proceeding to a second phase of actual adjustment of the distance between the grinding plates 7 and 8.

In this second phase the voltage $V_s$ is read and stored in a variable and a value of the voltage $V_k$ corresponding to this voltage $V_s$ is read from a correspondence table resident in the memory of the processor circuit 25c. In particular, the voltage $V_k$ is equal to the voltage variation to be applied to the transducer 18 with respect to the voltage $V_O$ to obtain the optimum grinding.

The voltage $V_p$ provided by the transducer 18 is then compared with the quantity $(V_O + V_k \pm \Delta)$, where $\Delta$ is a predetermined hysteresis value. If the voltage $V_p$ falls in an interval between the quantities $(V_O + V_k - \Delta)$ and $(V_O + V_k + \Delta)$ the motor 20 stops in that the desired distance between the grinding plates 7 and 8 as a function of the ambient humidity detected by the sensor 16 has been reached; otherwise the motor 20 is actuated in such a way as to cause an increase or reduction of $V_p$ and the second phase is performed again until the grinding plates 7 and 8 reach the desired distance.

Naturally, the principle of the invention remaining the same, the details of construction and the embodiments can be widely varied with respect to what has been described and illustrated purely by way of example, without by this departing from the scope of the present invention. This is true, for example, for the transducer 18 which could be made differently from that illustrated, for example by being directly associated with the motor 20, its function of detecting the distance between the grinding plates 7 and 8 remaining the same.

What is claimed is:

1. A device for controlling the grinding of coffee comprising:

a pair of facing grinding plates, means for adjusting the distance between said grinding plates whereby to vary the dimensions of coffee grains obtainable upon grinding, and ambient humidity sensor means; said means for adjusting the distance between said grinding plates being controlled in dependence on the humidity value detected by the humidity sensor means.

2. The device of claim 1, further including:

detector means for detecting the distance between said grinding plates and for producing a signal indicative thereof, and comparator means operable to compare the signal indicative of the distance between said grinding plates with the signal indicative of the humidity value detected by the humidity sensor means.

3. The device of claim 2, further including:

a processor circuit having a first input for acquiring said signal indicative of the humidity value detected by the humidity sensor means and a second input for acquiring said signal indicative of the distance between the grinding plates; said processor circuit being arranged to generate at least one output signal corresponding to at least one predetermined functional relationship between said signals acquired by said first and second inputs.

4. The device of claim 3, wherein said processor circuit is arranged to generate at least one associated output signal as a function of one of a plurality of functional relationships each of which corresponds to a different quality of coffee to be ground.

5. The device of claim 4, wherein said processor circuit has associated therewith selection means for selecting one of said predetermined functional relationships corresponding to the quality of coffee to be ground.

6. The device of claim 3, wherein said processor circuit includes an EPROM memory element operable to store said predetermined functional relationship.

7. The device of claim 6, wherein said functional relationship relates humidity values detectable by the humidity sensor means to corresponding values of the optimum distance between said grinding plates.

8. The device of claim 7, wherein said functional relationship can be expressed to a first approximation and in terms of a mathematical equation as:

$$D=AU+B,$$

where

U is the relative humidity,

D is the optimum distance between said grinding plates, and

A and B are numerical coefficients.

9. The device of claim 8, wherein the value of the coefficient A is in the region of −0.79 and the value of the coefficient B is in the region of 119.

10. The device of claim 2, wherein said comparator means is connected to indicator means operable to emit a signal resulting from the comparison performed by said comparator means whereby to guide manual adjustment of said means for adjusting the distances between said grinding plates.

11. The device of claim 2, wherein said comparator means have automatic adjustment means associated therewith, the automatic adjustment means being operable to adjust the distance between the grinding plates.

12. The device of claim 11, wherein the automatic adjustment means comprise:

an electric motor controlled by said processor circuit in dependence on said generated output signal and corresponding to a predetermined functional relationship between said signals acquired by said first and second inputs of said processor circuit.

13. The device of claim 12, wherein said electric motor is mechanically coupled to an adjustment ring nut, means fixing said adjustment ring nut to one of said grinding plates whereby rotation of said ring nut causes a variation in the distance between said grinding plates.

14. The device of claim 11, wherein between said comparator means and the automatic adjustment means there are interposed means for activating and deactivating the automatic adjustment means.

15. A doser grinder machine including a device for controlling the grinding of coffee comprising:

a pair of facing grinding plates, means for adjusting the distance between said grinding plates whereby to vary the dimensions of coffee grains obtainable upon grinding, and ambient humidity sensor means; said means for adjusting the distance between said grinding plates being controlled in dependence on the humidity value detected by the humidity sensor means.

16. A process for the control of coffee grinding by a doser-grinder machine, comprising:

a pair of facing grinding plates, means for adjusting the distance between said grinding plates so as to be able to vary the dimensions of the coffee grains obtainable upon grinding, the process comprising the steps of:

detecting the ambient humidity, and adjusting the distance between said grinding plates in dependence on the detected humidity value.

17. The process of claim 16, wherein the adjustment of the distance between the grinding plates is effected taking into account wear of the grinding plates.

18. The process of claim 16, wherein the adjustment of said distance between the grinding plates is obtainable by utilising a functional relationship between the detected humidity value and a corresponding optimum value of the distance between the grinding plates definable to a first approximation and in terms of a mathematical equation as:

$$D=AU+B,$$

where

U is the relative humidity,

D is the optimum distance between said grinding plates and

A and B are numerical coefficients.

19. The process of claim 18, wherein:

the value of the coefficient A is in the region of −0.79, and the value of the coefficient B is in the region of 119.

* * * * *